United States Patent [19]

Maddock et al.

[11] Patent Number: 5,041,980

[45] Date of Patent: Aug. 20, 1991

[54] METHOD AND APPARATUS FOR PRODUCING FAULT SIGNALS RESPONSIVE TO MALFUNCTIONS IN INDIVIDUAL ENGINE CYLINDERS

[75] Inventors: James B. Maddock, Washington; Bradley W. Harrell, Morton, both of Ill.

[73] Assignee: Caterpillar Inc., Peoria, Ill.

[21] Appl. No.: 533,209

[22] Filed: Jun. 4, 1990

[51] Int. Cl.$^5$ .................. G06F 15/48; G06F 15/50; G01L 3/26; G01L 5/13
[52] U.S. Cl. ................ 364/431.03; 364/431.07; 364/551.01; 73/116
[58] Field of Search .............. 364/431.01, 431.03, 364/431.04, 431.07, 431.08, 551.01; 73/116, 117.3; 123/419, 436

[56] References Cited

U.S. PATENT DOCUMENTS

| | | | |
|---|---|---|---|
| 3,972,230 | 8/1976 | Hanson et al. | 73/116 |
| 4,015,467 | 4/1977 | Armstrong | 73/116 |
| 4,016,753 | 4/1977 | Willenbecher et al. | 73/116 |
| 4,050,296 | 9/1977 | Benedict | 73/116 |
| 4,055,993 | 11/1977 | Rackliffe et al. | 73/116 |
| 4,055,995 | 11/1977 | Armstrong et al. | 73/116 |
| 4,055,998 | 11/1977 | Pettingell et al. | 73/119 R |
| 4,064,747 | 12/1977 | Rackliffe | 73/116 |
| 4,123,935 | 11/1978 | Maringer | 73/116 |
| 4,179,922 | 12/1979 | Bouverie et al. | 73/116 |
| 4,292,670 | 9/1981 | Reid et al. | |
| 4,295,363 | 10/1981 | Buck et al. | 73/117.3 |
| 4,348,893 | 9/1982 | Hendrix et al. | 73/116 |
| 4,383,440 | 5/1983 | Murata | 73/117.3 |
| 4,398,259 | 8/1983 | Levine | 364/551 |
| 4,495,920 | 1/1985 | Matsumura et al. | 123/436 |
| 4,627,275 | 12/1986 | Henein et al. | 73/112 |
| 4,697,561 | 10/1987 | Citron | 123/339 |
| 4,742,462 | 5/1988 | Fujimori et al. | 364/431.08 |

OTHER PUBLICATIONS

Article—A Real—Time Microprocessor-Based System for Engine Deficiency Analysis, published 1983, by A. K. Sood et al.

SAE Paper 880489—The Nippondenso Electronic Control System for the Diesel Engine, published 1988, by F. Murayama et al.

SAE paper 880185—Electronic Control Units of Bosch EDC Systems, by U. Flaig et al.

SAE Paper 870546—A Diagnostic Technique for the Identification of Misfiring Cylinder(s), published 1987, by S. F. Rezeka et al.

Primary Examiner—Parshotam S. Lall
Assistant Examiner—E. Pipala
Attorney, Agent, or Firm—Kirk A. Vander Leest

[57] ABSTRACT

Dynamic engine diagnostic devices are useful for detecting engine faults such as a misfiring cylinder during normal engine operation. Identification of the particular cylinder having the fault enables repairs to be made more efficiently. In the subject application, an apparatus is provided for detecting malfunctions in individual cylinders of an internal combustion engine having a rotating member driven by a plurality of cylinders. The apparatus includes a sensor for measuring the time between successive angular positions as the member rotates through at least one engine cycle and producing a plurality of period signals responsive respectively to the measured time intervals. Each engine cylinder has an equal number of the angular positions associated therewith, and the member makes one rotation per engine cycle. A deviation circuit receives the period signals and produces a deviation signal for each engine cylinder. Each deviation signal is responsive to a difference between period signals of a respective cylinder. An averaging circuit receives the deviation signals and produces an average signal responsive to an average of the deviation signals. A comparator receives the deviation and average signals, compares each deviation signal to the average signal, and produces respective fault signals in response to individual deviation signals differing from the average signal by more than a first threshold.

18 Claims, 4 Drawing Sheets

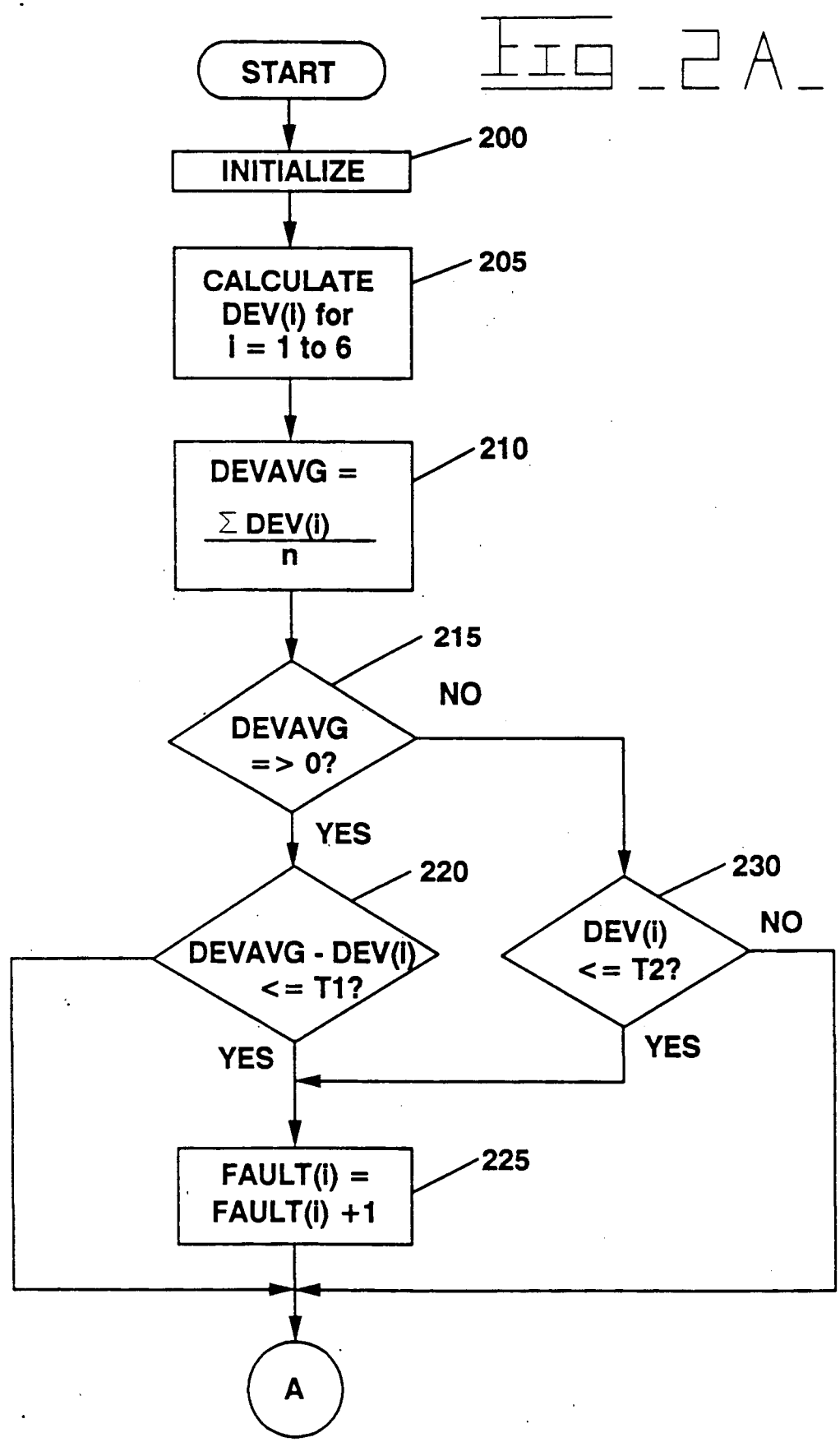

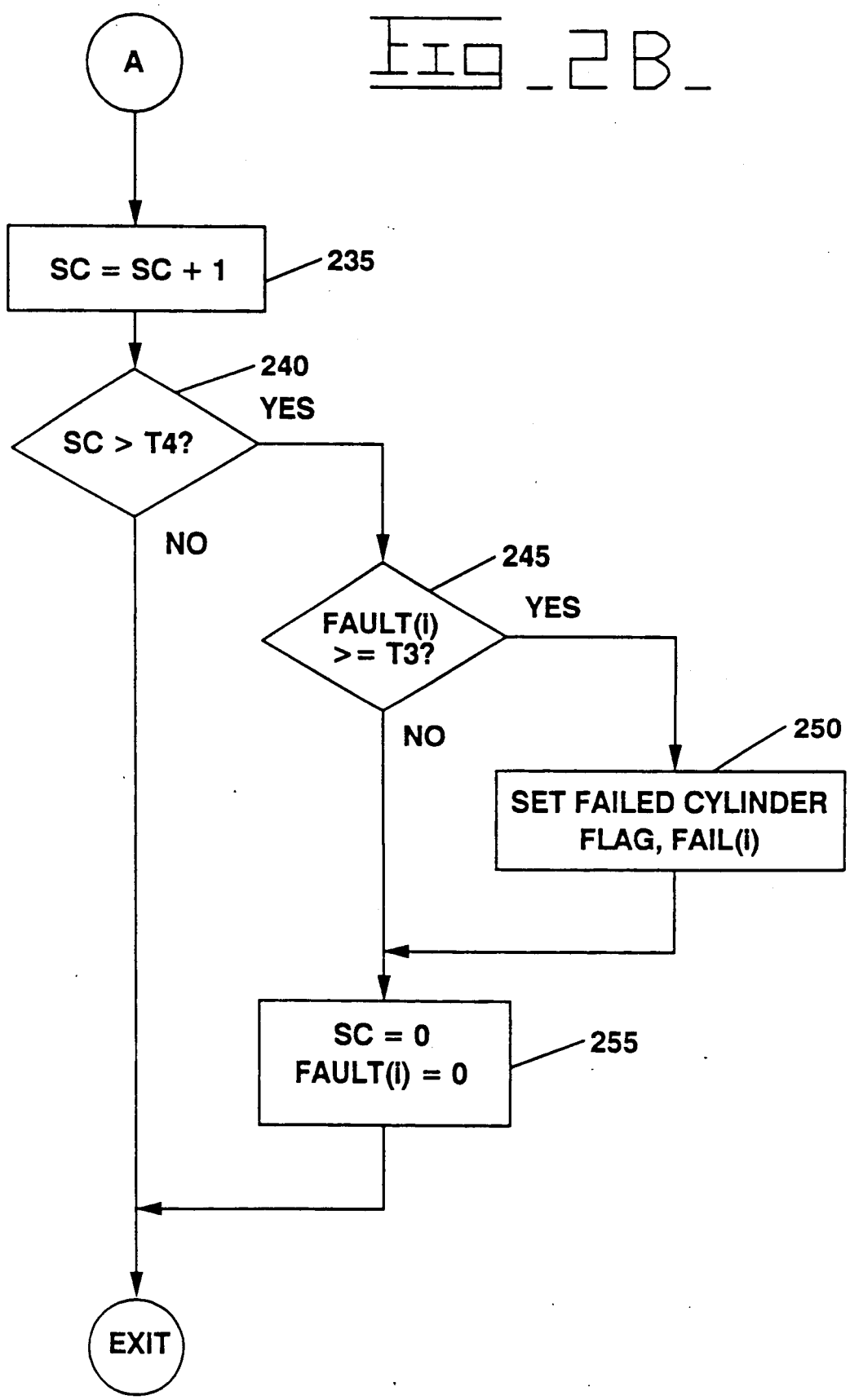
Fig_2B_

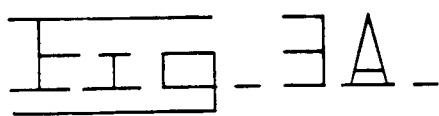
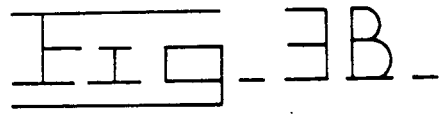
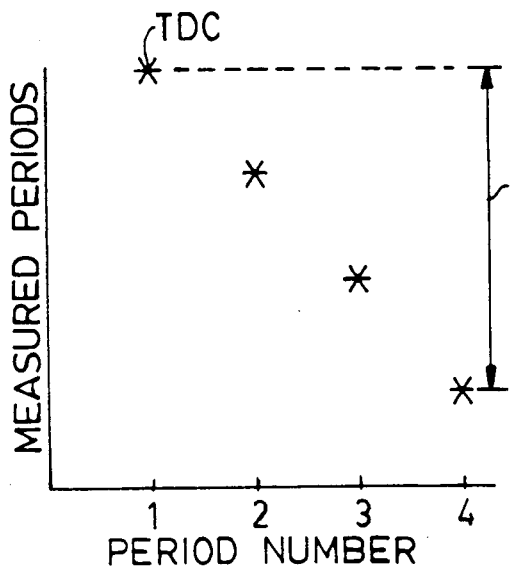
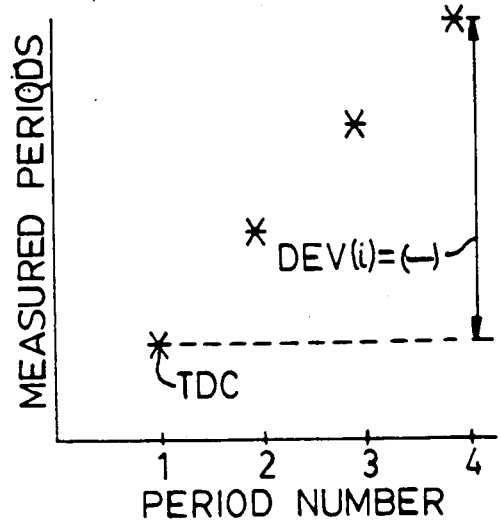
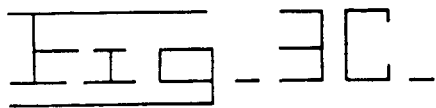
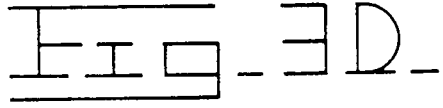
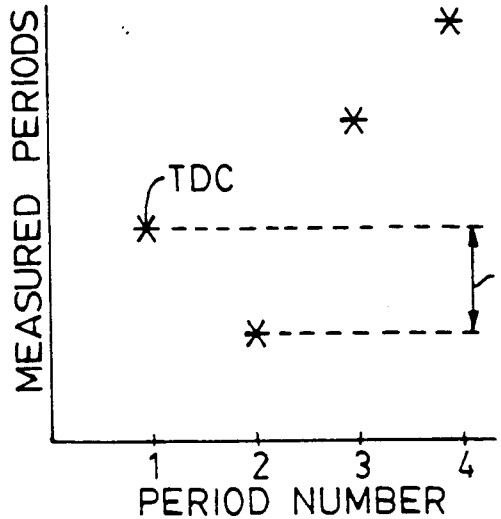
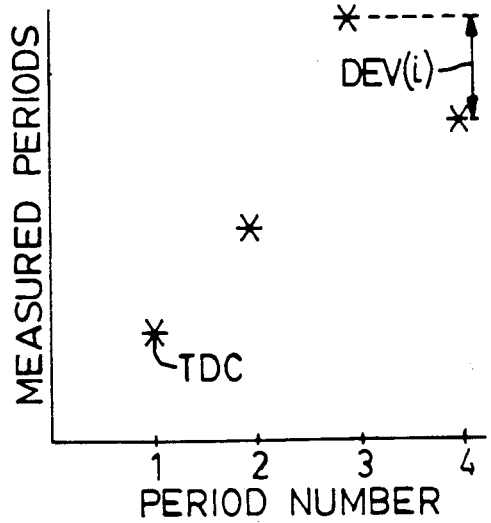

METHOD AND APPARATUS FOR PRODUCING FAULT SIGNALS RESPONSIVE TO MALFUNCTIONS IN INDIVIDUAL ENGINE CYLINDERS

DESCRIPTION

1. Technical Field

This invention relates generally to an engine diagnostic device and, more specifically, to an engine diagnostic device for detecting malfunctions in individual cylinders of a multicylinder internal combustion engine.

2. Background Art

A variety of engine diagnostic systems have been developed to diagnose the operating condition of an internal combustion engine. Such diagnostic systems have typically employed sensors mounted on an engine for detecting a predetermined amount of angular rotation of a rotatable element of the engine such as a crankshaft. More specifically, a sensor such as a magnetic pick-up sensor is commonly employed to sense the passage of gear teeth on a flywheel ring gear. The time interval between successive flywheel gear teeth is determined and then processed to provide an indication of an engine operating condition.

Systems utilizing such a measurement technique are disclosed in U.S. Pat. No. 4,015,467 which issued on Apr. 5, 1977 to Armstrong, 4,016,753 which issued on Apr. 12, 1977 to Willenbecher et al., 4,292,670 which issued on Sept. 29, 1981 to Reid et al., and 4,398,259 which issued on Aug. 9, 1983 to Levine. In these patents, speed measurements made while the engine is accelerating or decelerating are processed to yield measurements which can be utilized during torque and horsepower calculations or to diagnose engine faults.

U.S. Pat. No. 3,972,230 which issued on Aug. 3, 1976 to Hanson et al. discloses an apparatus and method of detecting uneven operation of individual cylinders in an engine. The engine is operated at a constant speed, and time periods between successive ignition times are measured. The deceleration rates between successive time periods are then computed along with the average deceleration rates for respective cylinders. Individual deceleration rates which exceed the average deceleration rate for a cylinder are detected to provide an indication of uneven cylinder operation.

In U.S. Pat. No. 4,050,296, which issued on Sept. 27, 1977 to Benedict, a system is disclosed for determining the relative compression of individual cylinders. Minimums and maximums of an engine parameter, such as starter current or sub-cyclic engine speed, are sensed while the engine is cranking. These sensed parameters are then processed to determine the relative compression of individual engine cylinders with respect to the remaining engine cylinders.

In U.S. Pat. No. 4,123,935, which issued on Nov. 7, 1978 to Maringer, the angular velocity of individual cylinders is measured over a predetermined angular range while the engine is operating under its own power at a predetermined speed. These measured speeds are then compared to the angular velocity for an entire engine revolution to determine a ratio, and the ratio is compared with a known value to determine if the engine is operating properly.

U.S. Pat. No. 4,064,747, which issued on Dec. 27, 1977 to Rackliffe et al., discloses a system wherein sub-cyclic speed measurements of an engine are made by detecting the difference between clock counts of an integral number of successive teeth on an engine flywheel to provide a plurality of speed measurements within each cylinder stroke of an engine subcycle. These measurements are utilized relative to each other without conversion to speed dimensions, to determine certain dynamic operating parameters of the engine. This detector may be used to determine relative power contribution of individual cylinders of the engine.

In U.S. Pat. No. 4,055,995, which issued on Nov. 1, 1977 to Armstrong et al., an engine diagnostic unit is disclosed which utilizes an acceleration burst between low and high engine speeds to provide horsepower measurements. Such measurements are compared with subsequent measurements to yield an indication of the amount of air in the fuel intake of the engine.

In U.S. Pat. No. 4,348,893, which issued on Sept. 14, 1982 to Hendrix et al., an engine analysis detector is provided for determining the compression of an engine. More specifically, speed measurements are made while the engine is cranking without ignition. Changes in speed during the compression stroke of each cylinder are mathematically processed to yield values corresponding to the compression of each cylinder.

The data acquisition unit disclosed in U.S. Pat. No. 4,179,922, which issued on Dec. 25, 1979 to Bouverie et al., measures successive crankshaft positions during engine rotation to provide a time duration between successive crankshaft positions. Time interval samples are generated and utilized to determine the existence of cylinder malfunctions.

U.S. Pat. No. 4,295,363, which issued on Oct. 20, 1981 to Buck et al., discloses an apparatus for diagnosing faults in the individual cylinders of an engine. Measurements corresponding to the time intervals between successive crankshaft positions are detected in at least one engine cycle. In a compression test a comparison of a standard engine cycle with a subsequent engine cycle is made and a ratio of the standard and subsequent values is compared with a threshold to provide an output indicating the existence of low compression or low power in a particular cylinder. However, this compression test must be performed while the engine is being cranked without power. A second test called a performance test is also disclosed for diagnosing certain faults while the engine is operating. However, this test requires that the engine be accelerated over a certain operating range.

In all of the previously disclosed engine diagnostic systems, the time interval measurements are taken during a predetermined engine operating mode, such as acceleration, deceleration, idling, etc. Thus, diagnosis of the operating condition of the engine takes place in only a small portion of the total engine operating range and then only for a short period of time. As such, the previously disclosed methods for detecting engine malfunctions have not been totally accurate over all engine operating conditions.

U.S. Pat. No. 4,627,275, which issued on Dec. 9, 1986 to Henein et al. recognizes the above problems. Henein et al. provides a diagnostic system which continuously monitors engine operation over a variety of engine operating conditions, such as idling, cruising, acceleration and deceleration. However, Henein et al. fails to provided a method for identifying which cylinder in a multicylinder engine is malfunctioning. In order to facilitate more efficient repairs, it is desirable to identify the particular cylinder which is malfunctioning.

The present application is directed to overcoming one or more of the problems as set forth above.

DISCLOSURE OF THE INVENTION

An apparatus is provided for detecting malfunctions in individual cylinders of an internal combustion engine having a rotating member driven by a plurality of cylinders. The apparatus includes a sensor for measuring the time between successive angular positions as the member rotates through at least one engine cycle and producing a plurality of period signals responsive respectively to the measured time intervals. Each engine cylinder has an equal number of angular positions associated therewith and the member makes one rotation per engine cycle.

A deviation circuit receives the period signals and produces a deviation signal for each engine cylinder. Each deviation signal is responsive to a difference between the period signals of a respective cylinder. An averaging circuit receives the deviation signals and produces an average signal responsive to an average of the deviation signal.

A comparator receives the deviation and average signals, compares each deviation signal to the average signal, and produces respective fault signals in response to individual deviation signals differing from the average signal by more than a first threshold.

BRIEF DESCRIPTION OF THE DRAWINGS

FIGS. 2A and 2B are flow diagrams which can be used to program a microprocessor to perform certain functions of the immediate engine diagnostic apparatus; and FIGS. 3A-D are graphs of sequential period measurements for individual engine cylinders;

DESCRIPTION OF THE PREFERRED EMBODIMENT

Figure 1A:
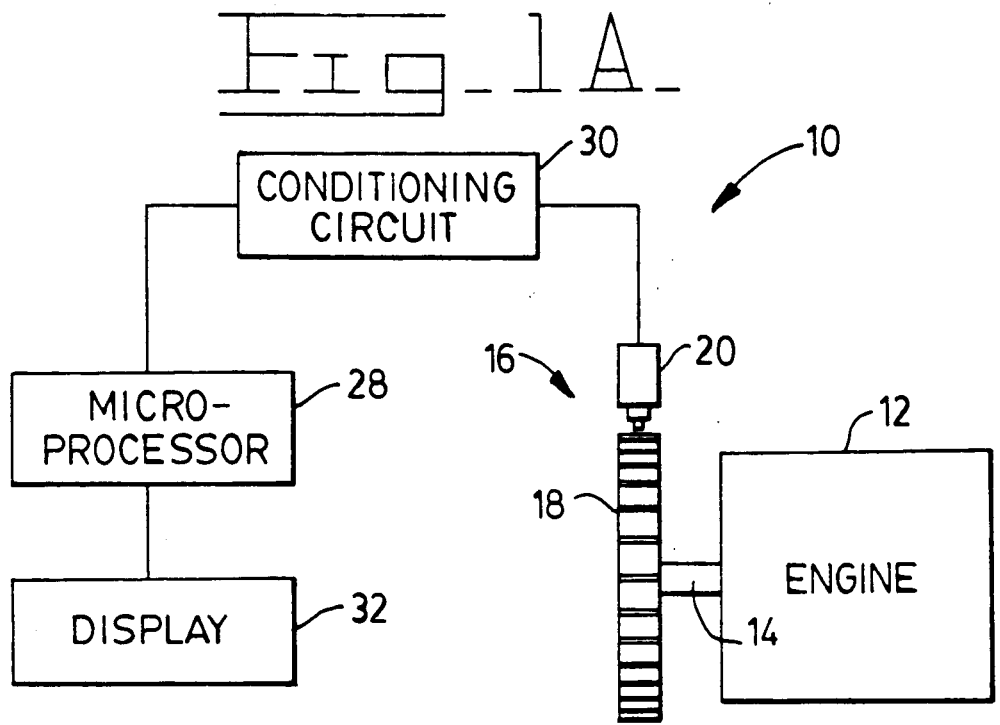
FIG. 1A is an illustrative block diagram of an embodiment of the immediate engine diagnostic apparatus.
Figure 1B:
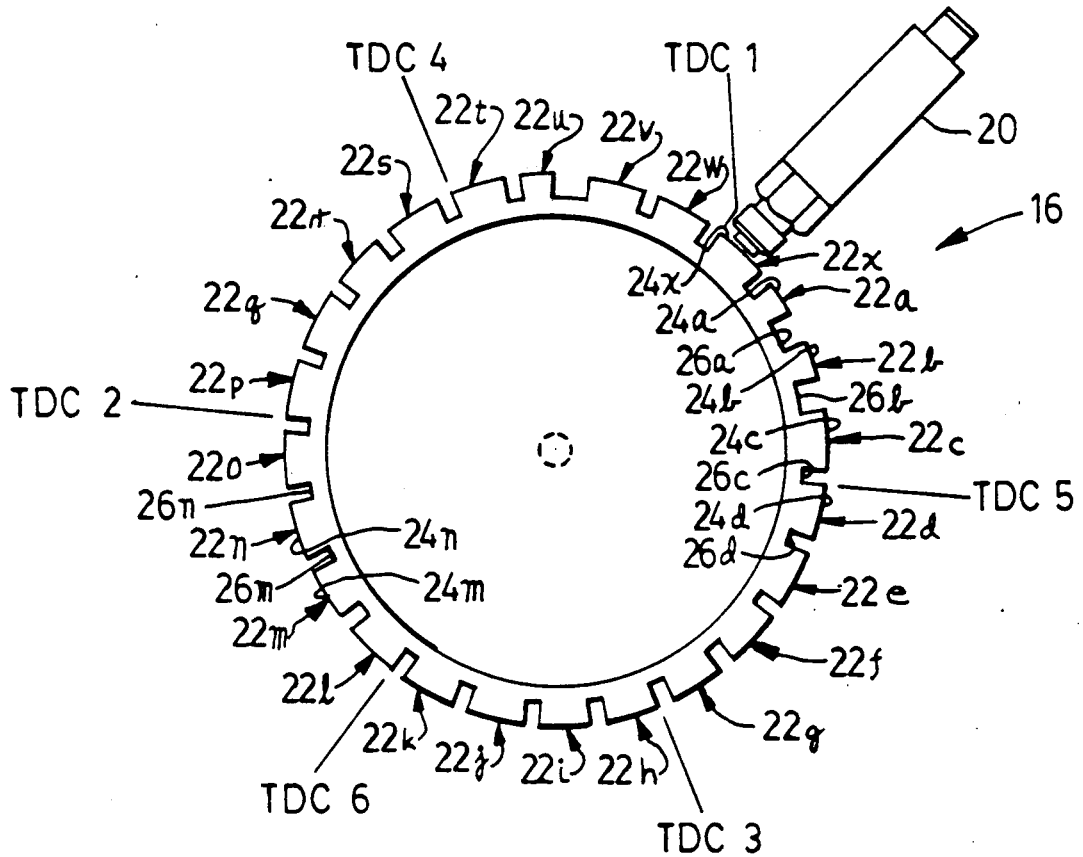
FIG. 1B is a detailed illustration of a selected portion of FIG. 1A.

Referring now to FIGS. 1A-1B, a preferred embodiment of the present engine diagnostic apparatus 10 will be discussed in connection with an internal combustion engine 12. In the preferred embodiment, the engine 12 is a six cylinder diesel engine; however, it should be understood that the apparatus 10 is not limited to use with this particular type of engine. The engine 12 includes a rotatable member 14 which rotates at a speed responsive to the speed of the engine 12. The rotatable member 14, rotates a predetermined number of revolutions every engine cycle, and in the preferred embodiment, the member 14 completes one rotation every engine cycle.

The apparatus 10 includes a sensor means 16 for measuring the time between successive angular positions as the member 14 rotates through at least one engine cycle and producing a plurality of period signals responsive respectively to the sensed time intervals. The sensor means 16 includes a disk 18 in the form of a toothed wheel or gear which rotates in synchronism with the rotatable member 14. A sensor 20 is associated with the disk 18 for producing period signals in response to the rotational speed of the disk 18, as is common in the art. The sensor means 16 in the immediate invention is disclosed in copending U.S. patent application Ser. No. 07/308,909 which was filed on Dec. 9, 1989 by Luebbering et al. It should be noted that while the sensor means 16 disclosed in Luebbering et al. is utilized in the preferred embodiment, numerous other sensors could be used to produce the period signals without departing from the immediate invention.

The preferred sensor means 16, as disclosed in Luebbering et al., will now be discussed briefly. The disk 18 includes a plurality of contiguous circumferential zones $22a-22x$ of equal circumferential distance (i.e. width) or angular extent. Each of the zones $22a-22x$ has an extending tooth $24a-24x$ and a notch portion $26a-26x$. The member 14 is, in turn, coupled to a camshaft (not shown) of the engine 12 and is mechanically timed to the engine 12 such that the piston in cylinder number 1 reaches top dead center during its combustion stroke when a rising edge of a preselected tooth passes the sensor 20. The remaining pistons reach top dead center during their combustion stroke when rising tooth edges spaced at integer multiples of 60° about the disk 14 relative to the rising edge of the reference tooth pass the sensor 18. In the preferred embodiment, the member 14 normally rotates counterclockwise, and the firing order of the engine is 1-5-3-6-2-4, as is shown in FIG. 1B. The disk 18 is configured such that of a piston occurs once every fourth tooth. Therefore, it is possible to make four period measurements during the combustion stroke of each cylinder. A disk having more teeth can be used if more period measurements are desired for each cylinder.

The sensor 20 is of the Hall effect type commonly known in the industry and is disposed at a preselected radial distance from the center of the disk 18 in a sensing relationship thereto. The sensor 20 produces a series of period signals responsive to the rotational speed of the disk as would be apparent to those skilled in the art. The period signals are delivered to a microprocessor 28 through an appropriate conditioning circuit 30, and the microprocessor 28 updates a period look-up table in response to the received period signals. The look-up table consists of a series of period values stored in sequential memory locations in a RAM unit (not shown). A software pointer is set to point to the memory location associated with top dead center of cylinder number 1 when the table is initialized, and top dead center of the remaining cylinders occurs every fourth sequential memory location in correspondence to the engine's firing order. The immediate engine diagnostic system performs its calculations using the period values from the period look-up table; however, it would also be possible to perform these calculations based on speed signals as would be apparent to those skilled in the art. A separate diagnostic routine accesses period values stored in the period look-up table and processes the stored values to determine the operating condition of individual cylinders, as explained below. The microprocessor 28 further provides a visual indication of the operating condition of individual engine cylinders on a display unit 32. The exact display forms no part of the immediate invention, and it could consist of a plurality failure lights, for example, which are activated in response to failed cylinder flags being set for respective cylinders.

Turning now to FIGS. 2A-2B and 3A-3D, a flowchart which can be used in programming the microprocessor 28 to perform certain functions of the immediate engine diagnostics apparatus 10 is discussed. In the block 200 the apparatus 10 is initialized when the engine 12 is started. More particularly, the diagnostic routine accesses the period look-up table to determine if it contains updated values for an entire engine cycle. The period look-up table is initially built when the engine 12 starts, and is thereafter continuously updated with new period values during engine operation. If the period look-up table contains updated values, control is passed to the block 205.

In the block 205, a period deviation DEV(i) is calculated for each engine cylinder in response to a difference between the periods measured for a respective cylinder, where i ranges from 1 to 6 and corresponds to the number of a particular cylinder. The period deviations DEV(i) are stored in selected memory locations of the RAM unit for later processing. The period deviations DEV(i) are calculated in response to the maximum decrease in the measured periods for a respective engine cylinder. The measured periods and engine speed are inversely related; therefore, a continuous decrease in the measured periods for a particular cylinder corresponds to a continuously increasing engine speed. In a properly operating engine, an air/fuel mixture in the cylinder ideally ignites when the piston is within a preselected angular range of top dead center during the combustion stroke. As would be apparent to those skilled in the art, the time of ignition is dependent on the timing of fuel injection into the cylinder as well as a variety of other engine parameters. When ignition occurs, expansion of the burning air/fuel mixture forces the piston downward, causing a momentary acceleration in the rotational speed of the engine 12 and thus the member 14. If the cylinder is operating properly, the measured periods will continuously decrease in magnitude from top dead center, as indicated in FIG. 3A. In this instance, the period deviation DEV(i) will be calculated in response to the difference between periods 1 and 4. More particularly, the magnitude of period 4 will be subtracted from the magnitude of period 1, thereby resulting in a positive period deviation DEV(i).

However, if a cylinder is misfiring due to a failed fuel injector, for example, the measured periods for that cylinder will continuously increase, as illustrated in FIG. 3B. In this instance, a negative deviation will be calculated in response to the difference between periods 1 and 4. FIGS. 3C and 3D indicate two other possible scenarios for the measured periods. In FIG. 3C, the periods initially decrease in magnitude and then increase in magnitude beginning with period 2. This situation could be indicative of an improper air/fuel mixture in that cylinder, for example. In this instance, the period deviation DEV(i) will be calculated by subtracting the magnitude of period 2 from that of period 1. In FIG. 3D, there is an increase from periods 1 to 3 and then a decrease between periods 3 and 4. This could be indicative of a cylinder in which fuel injection occurs too late in the combustion stroke, for example. In this instance, the period deviation DEV(i) will be calculated by subtracting the magnitude of period 4 from that of period 3. As can be seen from FIGS. 3A-D, the period deviation DEV(i) is always calculated as the maximum decrease, if any decrease occurs.

Continuing now with the discussion of FIGS. 2A-2B, after a period deviation DEV(i) is calculated for each cylinder, control is passed to the block 210. In the block 210 a deviation average DEVAVG is calculated and stored in the RAM unit (not shown). The deviation average DEVAVG is the average of the individual deviations DEV(i), as calculated in the block 205. In the preferred embodiment, the deviation average DEVAVG is calculated in response to the period deviations DEV(i) during one engine cycle; however, it should be understood that the average DEVAVG could be calculated over a plurality of engine cycles.

In the block 215 the deviation average DEVAVG is examined to determine if it is greater than or equal to zero. If it is, control is passed to the block 220 where the period deviations DEV(i) for individual cylinders are compared to the deviation average DEVAVG. If the period deviation DEV(i) for a particular cylinder is less than the deviation average DEVAVG by more than a first threshold T1, control is passed to the block 225 where a respective fault counter FAULT(i) is incremented by one. The magnitude of the first threshold T1 is empirically determined and, in the preferred embodiment, it is equal to one-half the magnitude of the deviation average DEVAVG for that engine cycle.

If, in the block 215, it is determined that the deviation average is negative, control is passed to the block 230. It is possible for the deviation average to be negative when the engine is operating at high speeds, for example. More specifically, as the speed of the engine 18 increases, the difference between periods for individual cylinders decreases and, therefore, the magnitude of the period deviations DEV(i) also decreases. If, as illustrated in FIG. 4A, one period deviation DEV(i) is very negative, the average can become negative. In the block 230 period deviations DEV(i) for individual cylinders are compared to a second threshold T2 and respective fault counters FAULT(i) are incremented by one in the block 225 if individual period deviations DEV(i) are less than the second threshold T2. The magnitude of the second threshold T2 is empirically determined under lab conditions by controllably misfiring selected engine cylinders and measuring the period deviations for the misfired cylinders. Blocks 220-230 are repeated for all the cylinders and then control is passed to the block 235. Separate tests are used in the blocks 220 and 225 for positive and negative deviation averages, respectively, because processing is quicker if an absolute threshold T2 is used instead of calculating one-half of a negative deviation average DEVAVG.

In the block 235 a sample counter SC is incremented by one indicating that the data for one engine cycle has been processed. Thereafter, control is passed to the block 240 where the sample counter SC is compared to a fourth threshold T4 to determine if enough samples have been taken to make a failed cylinder test. In the preferred embodiment, a failed cylinder test is made every fifty engine cycles.

If the sample counter SC is greater than or equal to the fourth threshold T4, control is passed to the block 245 where a failed cylinder test is made for each cylinder. More specifically, the fault counter FAULT(i) for each cylinder is compared to a third threshold T3, and control is passed to the block 255 in response to individual fault counters FAULT(i) being greater than or equal to the third threshold T3. In the preferred embodiment the third threshold T3 is selected to be forty. In the block 250, respective failed cylinder flags FAIL(i) are set in a memory device (not shown) in response to individual cylinders failing the test of block 245. It is preferable to store the failed cylinder flags FAIL(i) in a semipermanent memory device, such as an EEPROM (not shown), so that the flags FAIL(i) remain set if power to the microprocessor is lost. Blocks 245 and 250 are repeated until all the fault counters FAULT(i) have been checked and then control is passed to the block 255. In the block 255, the sample counter SC and fault counters FAULT(i) are reset to zero.

The microprocessor 28 can be programmed to provide a visual indication on the display 32 in response to the failed cylinder flags, as would be apparent to those skilled in the art. The exact display forms no part of the immediate invention, and it could consist of a plurality failure lights (not shown), for example, which are activated in response to failed cylinder flags FAIL(i) being set for individual cylinders.

Industrial Applicability

Dynamic engine diagnostic devices are useful for detecting engine faults such as a misfiring cylinder. Identification of the particular cylinder having the fault enables repairs to be made more efficiently. The subject apparatus 10 continuously monitors the operation of a multicylinder engine 12 and provides an indication of faults in individual engine cylinders.

A sensor means 16 measures the time between successive angular positions of a rotating member 14 driven by the engine 12 and produces a plurality of period signals responsive respectively to the sensed time intervals. The sensor means 16 makes an equal number of these period measurements for each cylinder during the combustion stroke of a respective cylinder. The period signals are received by a microprocessor 28 which stores the signals in a period look-up table for later processing.

A separate diagnostic routine periodically accesses the period look-up table and retrieves the period values stored therein for further analysis. In the preferred embodiment, the diagnostic routine analyzes the period values for one engine cycle; however, analysis based on multiple engine cycles is analogous to that of a single engine cycle. A period deviation DEV(i) is calculated for each cylinder in response to a difference between the period measured for a respective cylinder. More specifically, the period deviation DEV(i) is responsive to the maximum decrease in the periods measured for a cylinder starting from top dead center of the combustion stroke. If the period continuously increase in magnitude from top dead center, a negative period deviation is calculated.

Thereafter, an average deviation DEVAVG is calculated in response to the averages of the period deviations DEV(i) for a single engine cycle. If the deviation average DEVAVG is greater than or equal to zero, fault counters FAULT(i) are incremented in response to respective period deviations DEV(i) differing from the deviation average DEVAVG by more than a first threshold T1. If the deviation average is negative, fault counters FAULT(i) are incremented in response to respective period deviations being less than a second threshold T2.

After a predetermined number of engine cycles, a failed cylinder test is performed. More specifically, the fault counters FAULT(i) are checked after a predetermined number of engine cycles, and failed cylinder flags FAIL(i) are set in an EEPROM (not shown) in response to respective fault counters FAULT(i) exceeding a third threshold T3. In the preferred embodiment, a failed cylinder flag FAIL(i) is set if more than forty faults are recorded for a respective cylinder during fifty engine cycles. The microprocessor 28 is programmed to provide a visual indication of a failed cylinder in response to respective failed cylinder flags FAIL(i) on a display unit 32.

Other aspects, objects, and advantages of this invention can be obtained from a study of the drawings, the disclosure, and the appended claims.

We claim:

1. An apparatus for detecting malfunctions in individual cylinders of an internal combustion engine having a rotating member driven by a plurality of cylinders, comprising:

sensor means for measuring the time between successive angular positions as said member rotates through at least one engine cycle and producing a plurality of period signals responsive respectively to said measured time intervals, wherein each engine cylinder has an equal number of said angular positions associated therewith and said member makes at least one rotation per engine cycle;

deviation means for receiving said period signals and producing a deviation signal for each engine cylinder, said deviation signal being responsive to a difference between said period signals of a respective cylinder;

average means for receiving said deviation signals and producing an average signal responsive to an average of said deviation signals; and comparator means for receiving said deviation and average signals, comparing each deviation signal to said average signal, and producing respective fault signals in response to individual deviation signals differing from said average signal by more than a first threshold.

2. An apparatus as set forth in claim 1 wherein said deviation means produces said deviation signal in response to the maximum decrease between period signals for a respective engine cylinder.

3. An apparatus as set forth in claim 2 wherein a negative deviation signal is produced in response to said period signals associated with a respective cylinder successively increasing in magnitude.

4. An apparatus as set forth in claim 1 wherein said comparator means produces said fault signal for a cylinder in response to said deviation signal being less than than said average signal by at least said first threshold.

5. An apparatus as set forth in claim 4 wherein said first threshold is equal to one-half the magnitude of said average signal.

6. An apparatus as set forth in claim 1 wherein said comparator means produces said fault signals in response to respective deviation signals being less than a second threshold if said average signal is negative.

7. An apparatus as set forth in claim 1 including a means for receiving said fault signals, producing a plurality of summed fault signals, each of said summed fault signals being responsive to a sum of said fault signals for a respective cylinder over time, and producing failed cylinder signals responsive respectively to individual summed fault signals exceeding a third threshold.

8. An apparatus as set forth in claim 7 wherein said failed cylinder signal is produced in response to the the number of fault signals produced for a respective cylinder during a preselected number of engine cycles.

9. An apparatus for detecting malfunctions in individual cylinders of an internal combustion engine having a rotating member driven by a plurality of said cylinders, comprising:

sensor means for measuring the time between successive angular positions as said member rotates through at least one engine cycle and producing a plurality of period signals responsive respectively to said measured time intervals, wherein each engine cylinder has an equal number of said angular positions associated therewith and said member makes at least one rotation per engine cycle;

deviation means for receiving said period signals and producing a deviation signal for each engine cylinder, said deviation signal being responsive to a difference between said period signals of a respective cylinder;

average means for receiving said deviation signals and producing an average signal responsive to an average of said deviation signals; and comparator means for receiving said deviation and average signals, determining if said average signal is less than, equal to, or greater than zero, producing respective fault signals in response to said deviation signals being less than a third preselected threshold if said average signal is less than zero, and producing respective fault signals in response to individual deviation signals being less than said average signal by more than a first threshold if said average signal is greater than or equal to zero.

10. A method for detecting malfunctions in individual cylinders of an internal combustion engine having rotating member driven by a plurality of cylinders, comprising the steps of:

sensing the time between successive angular positions as said member rotates through at least one engine cycle and producing a plurality of period signals responsive respectively to said measured time intervals, wherein each engine cylinder has an equal number of said angular positions associated therewith and said member makes at least one rotation per engine cycle;

producing a deviation signal for each engine cylinder, said deviation signal being responsive to a difference between said period signals of a respective cylinder;

producing an average signal responsive to an average of said deviation signals; and comparing each deviation signal to said average signal and producing respective fault signals in response to individual deviation signals differing from said average signal by more than a first threshold.

11. A method as set forth in claim 10 wherein said deviation signal is produced in response to the maximum decrease between period signals for a respective engine cylinder.

12. A method as set forth in claim 11 wherein a negative deviation signal is produced in response to said period signals for a respective cylinder successively increasing in magnitude.

13. A method as set forth in claim 10 wherein said fault signal for a cylinder is produced in response to said deviation signal for that cylinder being less than than said average signal by said first threshold.

14. A method as set forth in claim 13 wherein said first threshold is equal to one-half the magnitude of said average signal.

15. A method as set forth in claim 10 wherein said fault signals are produced in response to respective deviation signals being less than a third threshold when said average signal is negative.

16. A method as set forth in claim 10 further including the steps of:

producing a plurality of summed fault signals, each being responsive to a sum of said fault signals for a respective cylinder over time; and producing failed cylinder signals responsive respectively to individual summed fault signals exceeding a third threshold.

17. A method as set forth in claim 16 wherein said failed cylinder signal is produced in response to the the number of fault signals produced for a respective cylinder during a preselected number of engine cycles.

18. An apparatus for detecting malfunctions in individual cylinders of an internal combustion engine having a rotating member driven by a plurality of cylinders, comprising:

sensor means for measuring the time between successive angular positions as said member rotates through at least one engine cycle and for producing a plurality of period signals responsive respectively to said measured time intervals, wherein each engine cylinder has an equal number of said angular position associated therewith and the member makes at least one rotation per engine cycle;

deviation means for receiving said period signals and producing a deviation signal for each engine cylinder in response to the maximum decrease between period signals for a respective engine cylinder;

average means for receiving said deviation signals and producing an average signal responsive to an average of said deviation signals; and comparator means for receiving said average and deviation signals, comparing each deviation signal to said average signal, and producing respective fault signals in response to individual deviation signals differing from said average signal by more than a first threshold.

* * * * *